US009497352B2

(12) United States Patent
Inoue et al.

(10) Patent No.: US 9,497,352 B2
(45) Date of Patent: Nov. 15, 2016

(54) COMMUNICATION APPARATUS AND CONTROL METHOD THEREOF

(75) Inventors: Yutaka Inoue, Tokyo (JP); Katsuhiro Inoue, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1143 days.

(21) Appl. No.: 12/404,234

(22) Filed: Mar. 13, 2009

(65) Prior Publication Data

US 2009/0244609 A1 Oct. 1, 2009

(30) Foreign Application Priority Data

Mar. 25, 2008 (JP) ................................ 2008-079215

(51) Int. Cl.
 *G06F 3/12* (2006.01)
 *H04N 1/333* (2006.01)
 *H04N 1/327* (2006.01)

(52) U.S. Cl.
 CPC .......... *H04N 1/333* (2013.01); *H04N 1/32797* (2013.01); *H04N 1/33353* (2013.01); *H04N 1/33361* (2013.01)

(58) Field of Classification Search
 CPC ............. H04N 1/32797; H04N 1/333; H04N 1/33353; H04N 1/33661
 USPC ................................................. 358/1.1, 1.15
 See application file for complete search history.

(56) References Cited

U.S. PATENT DOCUMENTS

| 5,055,945 | A | * | 10/1991 | Oguma .............. H04N 1/00912 358/434 |
| 5,073,921 | A | * | 12/1991 | Nomura et al. ......... 379/100.15 |
| 6,614,892 | B1 | * | 9/2003 | Hashimoto et al. ..... 379/100.14 |
| 6,993,042 | B1 | * | 1/2006 | Akatsuka et al. ............ 370/447 |
| 2007/0211628 | A1 | * | 9/2007 | Ikeda et al. .................... 370/230 |
| 2010/0067038 | A1 | * | 3/2010 | Aoki ........................... 358/1.14 |

FOREIGN PATENT DOCUMENTS

| JP | 7-177335 A | 7/1995 |
| JP | 7-221958 A | 8/1995 |
| JP | 09-247037A A | 9/1997 |
| JP | 2001-045166 A | 2/2001 |

* cited by examiner

*Primary Examiner* — Iriana Cruz
(74) *Attorney, Agent, or Firm* — Carter, DeLuca, Farrell & Schmidt, LLP

(57) ABSTRACT

This invention provides a communication apparatus, which designates, when a line designated as that used for a specific application falls into a disabled state, another line as a new line used for the specific application. To accomplish this, even when at least one of a plurality of lines falls into a disabled state, and when the line in the disabled state is designated as a line used for the specific application, the communication apparatus designates a line other than the line in the disabled state among the plurality of lines as a new line used for the specific application.

7 Claims, 14 Drawing Sheets

COMMUNICATION APPARATUS AND CONTROL METHOD THEREOF

BACKGROUND OF THE INVENTION

Field of the Invention

The present invention relates to control to be executed when at least one of a plurality of lines falls into a disabled state in a communication apparatus having a plurality of lines.

Description of the Related Art

In recent years, communication apparatuses having a plurality of lines have prevailed. Especially, in the case of a facsimile apparatuses, when one facsimile apparatus is placed in correspondence with each of the lines to be used, the cost increases, and a large space is required to place the facsimile apparatuses. For this reason, a cost reduction and space savings may be attained by connecting a plurality of lines to one facsimile apparatus.

Furthermore, in recent years, it has become possible to increase the number of lines using a dial-in service. The dial-in service logically increases the number of lines by further giving a new telephone number in addition to a telephone number given to a physically laid line (to be referred to as a physical line hereinafter) without increasing the number of physical lines. In the following description, a line added in this way will be referred to as a logical line.

When using the dial-in service, one or a plurality of logical lines can be added to one physical line. For example, when one subscribes to one physical line with a service provider, a unique telephone number is given to that physical line. Assume that a telephone number "03-1111-1111" is given to the physical line. When one also subscribes to the dial-in service, a new telephone number "03-1111-2222" is given in addition to that of the physical line. That is, even when an incoming call to either the telephone number "03-1111-1111" or "03-1111-2222" arrives, data is received via the same physical line. In this way, using the dial-in service, the number of lines can be increased and a plurality of telephone numbers can be used without increasing the number of physical lines.

When one communication apparatus has a plurality of lines, as described above, one of the plurality of lines of this communication apparatus may be designated as a line used for a specific application. For example, in Japanese Patent Laid-Open No. 07-221958, when broadcasting data using lines 1 and 2, control is made to continuously broadcast data via line 1 and to intermittently broadcast data via line 2. As a result, the chance of incoming call reception increases for line 2, and the communication apparatus can be prevented from being busy for a long period of time due to continuous broadcasting.

However, the aforementioned related art does not propose any operation to be executed when one of the plurality of lines of one communication apparatus falls into a disabled state. That is, when a line designated as that used for the specific application falls into a disabled state due to movement of the location of the communication apparatus, canceling of the dial-in service contract, and the like, and a line used for that specific application is no longer available.

SUMMARY OF THE INVENTION

The present invention enables realization of a communication apparatus which designates, when a line designated as that used for a specific application falls into a disabled state, another line as a new line used for the specific application.

One aspect of the present invention provides a communication apparatus having a plurality of lines, including a detection unit configured to detect if at least one line of the plurality of lines has fallen into a disabled state; a determination unit configured to determine, when the detection unit detects that the at least one line of the plurality of lines has fallen into the disabled state, whether or not the line that has fallen into the disabled state is designated as a line used for a specific application; and a designation unit configured to designate, when it is determined as a result of determination by the determination unit that the line that has fallen into the disabled state is designated as the line used for the specific application, a line other than the line that has fallen into the disabled state of the plurality of lines as a new line used for the specific application.

Another aspect of the present invention provides a method of controlling a communication apparatus having a plurality of lines, including detecting if at least one line of the plurality of lines has fallen into a disabled state; determining, when it is detected in the detecting step that the at least one line of the plurality of lines has fallen into the disabled state, whether or not the line that has fallen into the disabled state is designated as a line used for a specific application; and designating, when it is determined as a result of determination in the determining step that the line that has fallen into the disabled state is designated as the line used for the specific application, a line other than the line that has fallen into the disabled state of the plurality of lines as a new line used for the specific application.

Further features of the present invention will become apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

The present invention is directed to a communication apparatus having a plurality of lines, and designates, when a line designated as that used for a specific application falls into a disabled state, another line as a new line used for the specific application.

For example, the line used for the specific application indicates a line which is designated as a priority transmission line to be preferentially selected upon automatically selecting a line used upon transmitting data to another apparatus to which the communication apparatus is connected via a telephone network. Or the line used for the specific application indicates a line which is designated to automatically transfer data, which is received by the communication apparatus using a specific line, to another apparatus. In the present invention, when a line designated as that used for the specific application falls into a disabled state, another line is designated as a new line used for that application, so as to prevent the absence of the line used for that application.

In embodiments to be described hereinafter, a printer as an image forming apparatus will be explained as an example of the communication apparatus. However, the present invention is not limited to the printer to be used as the communication apparatus, and is applicable to any other communication apparatuses as long as they have a plurality of lines, and transmit or receive data to or from other apparatuses via lines.

A first embodiment will be described below with reference to FIGS. 1 to 7. This embodiment will explain control executed when a line designated as a priority transmission line falls into a disabled state in a communication apparatus having a plurality of lines. Note that a line having a telephone number given to a physically laid line upon signing up for use of a telephone line with a service provider for the first time will be referred to as a physical line hereinafter, for the sake of convenience. Also, a line of a telephone number which is given to one physical line in addition to the telephone number of the physical line upon signing up for a dial-in service with the service provider will be referred to as a logical line hereinafter. Upon signing up for the dial-in service, the dial-in service for the communication apparatus of this embodiment is set to be valid in an exchange on a telephone network managed by the service provider. Upon canceling the dial-in service contract, since the setting in the exchange is invalidated, no dial-in service is available even when one attempts to use that service from the communication apparatus.

Figure 7:
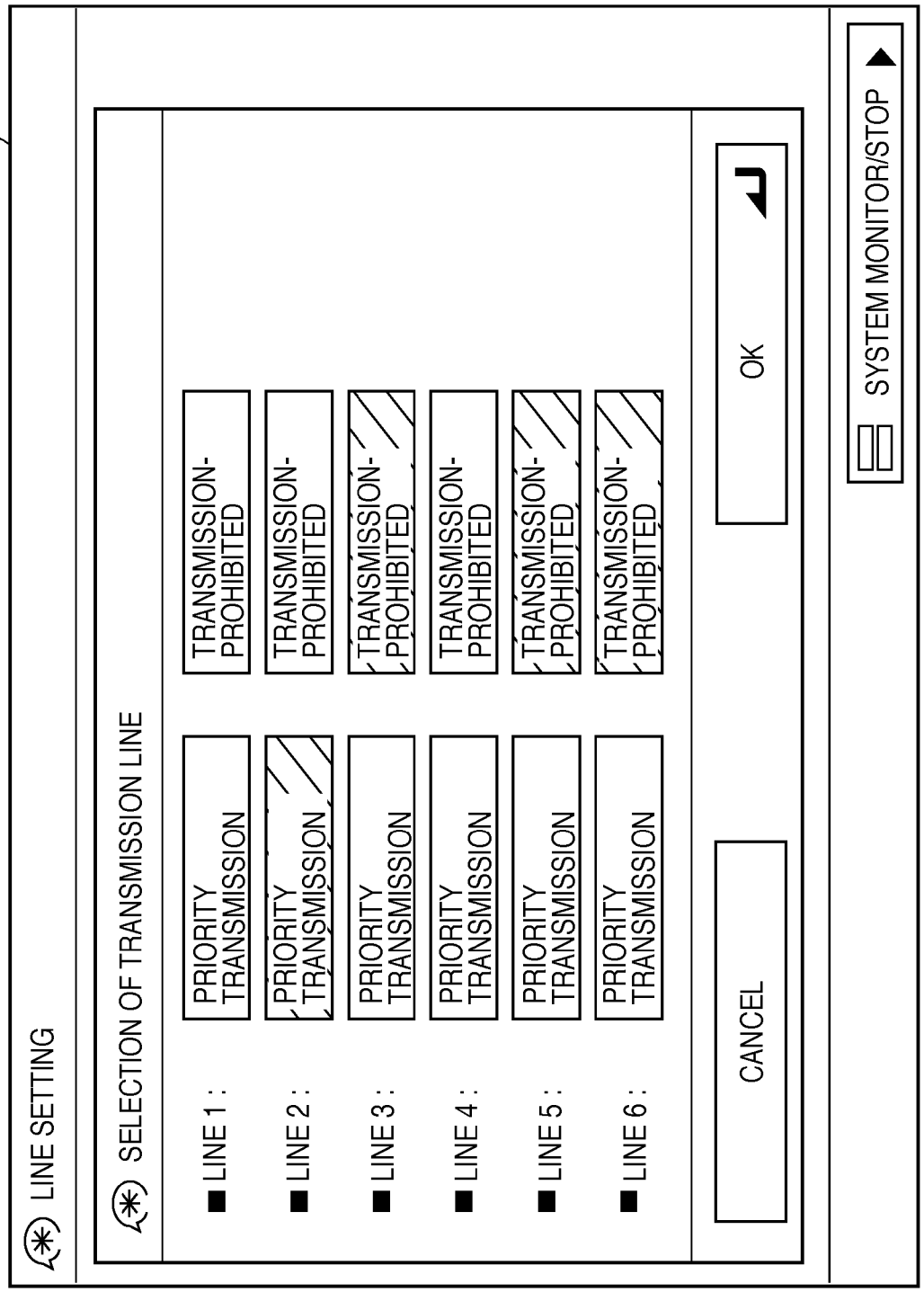
FIG. 7 is a view for explaining a function of designating a priority transmission line.

A case assumed by this embodiment will be described first with reference to FIG. 7. FIG. 7 is a view for explaining a function of designating a priority transmission line according to this embodiment. As a method of selecting a line used when the communication apparatus transmits data, a method of directly designating a specific line (e.g., line 1, 2, 3, or the like) by a sender, and a method of automatically selecting a line without any sender's explicit designation of a specific line (automatic line selection) are available. When a specific line is directly designated, data is transmitted using the designated line. However, when automatic line selection is designated, the communication apparatus automatically selects a line used to transmit data, and transmits the data.

As a priority transmission line which is preferentially selected upon automatically selecting a line used to transmit data, the administrator can designate a specific line in advance. That is, when a sender does not directly designate any line, the communication apparatus automatically selects a line to be used. In this case, the communication apparatus selects a line designated as the priority transmission line in preference to other lines.

In addition to the priority transmission setting, a transmission-prohibited setting can also be made. That is, when the administrator of the communication apparatus designates a specific line as a transmission-prohibited line, data transmission using that line is prohibited. As a result, a line designated as a transmission-prohibited line can be used as a receive-only line.

FIG. 7 shows a setting screen 700 upon designation of a priority transmission line and transmission-prohibited lines. The example shown in FIG. 7 shows a case in which the communication apparatus has six lines including physical and logical lines, and line numbers of these lines are respectively lines 1 to 6. To these lines 1 to 6, "priority transmission" and "transmission-prohibited" settings can be made, and the set contents are shaded in FIG. 7. More specifically, in the example shown in FIG. 7, line 2 is designated as a priority transmission line, and lines 3, 5, and 6 are designated as transmission-prohibited lines. Assume that "transmission-prohibited" can be set for one or a plurality of lines, but "priority transmission" can be set for only one line. Also, both the "priority transmission" and "transmission-prohibited" settings cannot be made for the same line.

In the example shown in FIG. 7, when automatic line selection is designated upon transmission, the use status of line 2 designated as the priority transmission line is detected. When line 2 is ready (when it is not already used for another communication), data is transmitted using line 2. On the other hand, when line 2 is busy, a line used to transmit data is selected from lines which are not set as "transmission-prohibited" of those other than line 2, and data is transmitted using the selected line.

This embodiment assumes a case in which a line falls into a disabled state due to movement of the location of the communication apparatus, canceling of the dial-in service contract with the service provider, or the like in the communication apparatus with the above settings. In the example of FIG. 7, since line 2 is designated as the priority transmission line, a case will be explained below wherein this line 2 falls into a disabled state.

That is, when line 2 falls into a disabled state in such a situation, if the apparatus is used without changing the settings, the line designated as the priority transmission line is not available, and automatic selection of a line may be disabled. In the example shown in FIG. 7, since lines which are not set as transmission-prohibited (lines 1 and 4) are available, even when a line set as priority transmission is not available, if these lines are ready, data may be transmitted using one of these lines. However, when all lines other than the line which has fallen into a disabled state are set as transmission-prohibited, no line used to transmit data is available, and data can no longer be transmitted. Even though transmission is not disabled, a line may be undesirably used to transmit data against the intention of the administrator of the communication apparatus.

Hence, in this embodiment, when a line which is designated as that used for the specific application (priority transmission line) falls into a disabled state, another line is designated as a new priority transmission line. This embodiment will be described in more detail below.

Figure 1:
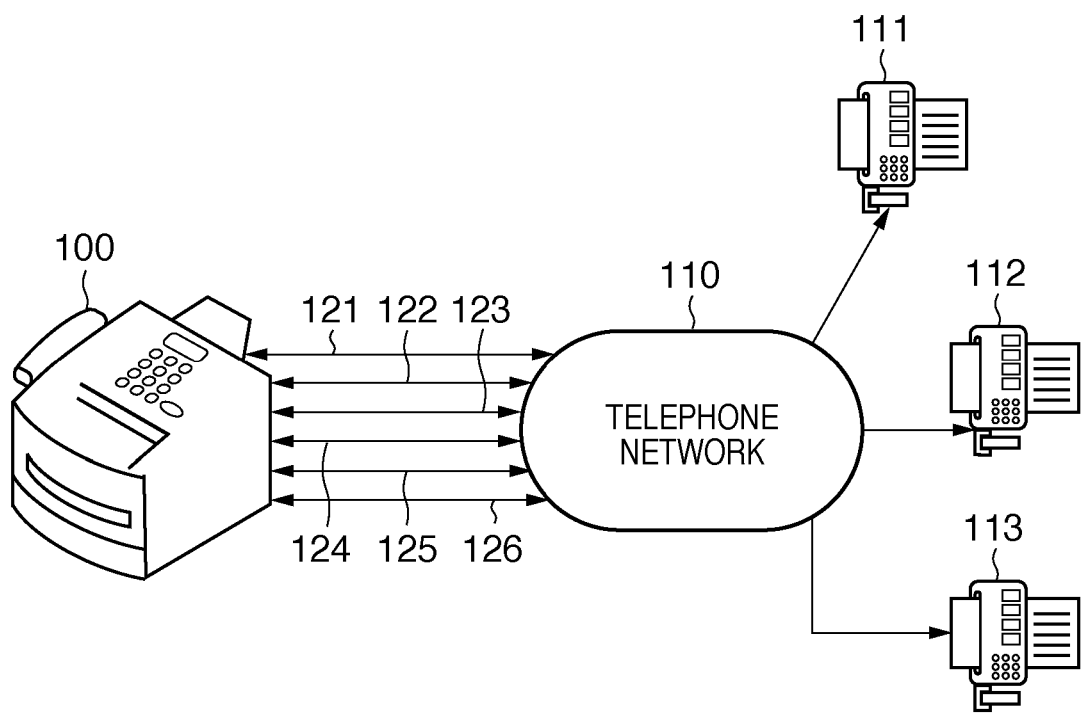
FIG. 1 is a view showing a network system including a communication apparatus according to the first embodiment.

FIG. 1 is a view showing a communication system including the communication apparatus according to the first embodiment. As the communication apparatus, a printer 100 as an image forming apparatus will be exemplified below. Note that the printer 100 is a multi-function peripheral, and has a FAX function.

The printer 100 is connected to external apparatuses 111, 112, and 113 having a FAX function via a telephone network (PSTN) 110. The printer 100 and telephone network 110 are connected via a plurality of lines 121, 122, 123, 124, 125, and 126. These lines include physical and logical lines. The printer 100 transmits image data to the external apparatuses 111, 112, and 113 connected via the telephone network 110. In this case, the printer 100 selects one of the plurality of lines 121 to 126, and transmits image data using the selected line.

Figure 2:
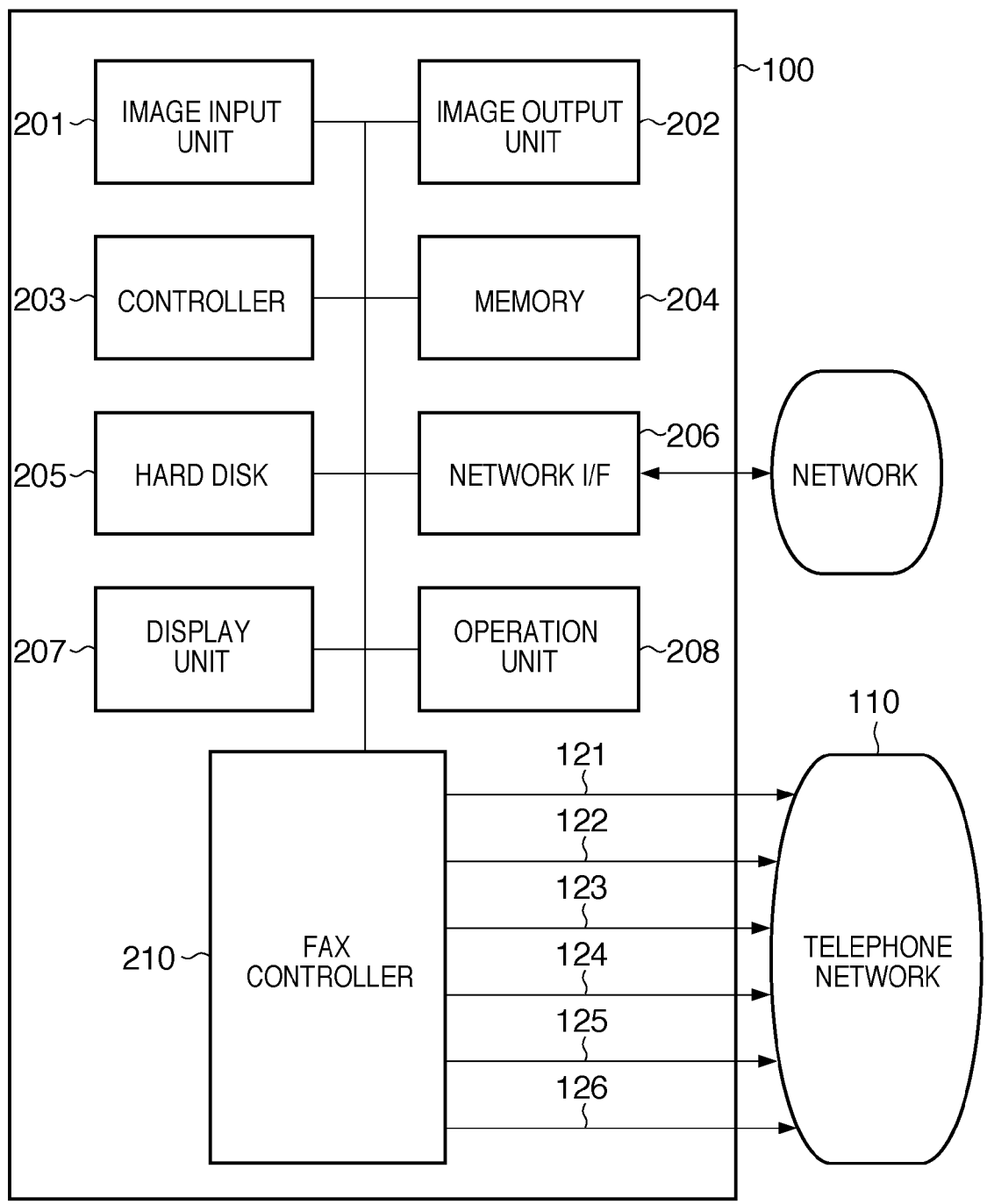
FIG. 2 is a block diagram showing an example of the control arrangement of a printer 100 according to the first embodiment.

The arrangement of the printer 100 will be described below with reference to FIG. 2. FIG. 2 is a block diagram showing an example of the control arrangement of the printer 100 according to the first embodiment. As the control arrangement of the printer 100, mainly that relevant to the present invention will be explained. Therefore, the printer 100 may be configured to include control blocks other than those to be described below.

The printer 100 comprises an image input unit 201, image output unit 202, controller 203, memory 204, hard disk 205, network I/F 206, display unit 207, operation unit 208, and FAX controller 210.

The image input unit 201 optically scans a document image using a scanner or the like, and converts the scanned image into image data. The image output unit 202 comprises a printer engine of, for example, an electrophotography system or the like, and prints image data on a print sheet or the like. The controller 203 systematically controls the printer 100. The memory 204 stores image data, and program codes/data of the controller 203. The hard disk 205 stores various data such as image data and the like. The network I/F 206 connects the printer 100 to an IP network.

The display unit 207 comprises an LCD or the like, and displays information for the operator (sender or administrator). The operation unit 208 includes keys and the like, and accepts input from the operator. The display unit 207 and operation unit 208 may be integrated by adopting a touch panel system. The FAX controller 210 controls a FAX function that accommodates a plurality of lines, and the printer 100 is connected to the telephone network 110 via this FAX controller 210. The telephone network 110 is the PSTN, as shown in FIG. 1, and supports six lines (lines 121 to 126) in this embodiment. Note that the lines 121 to 126 will also be referred to as lines 1 to 6 hereinafter.

Figure 3:
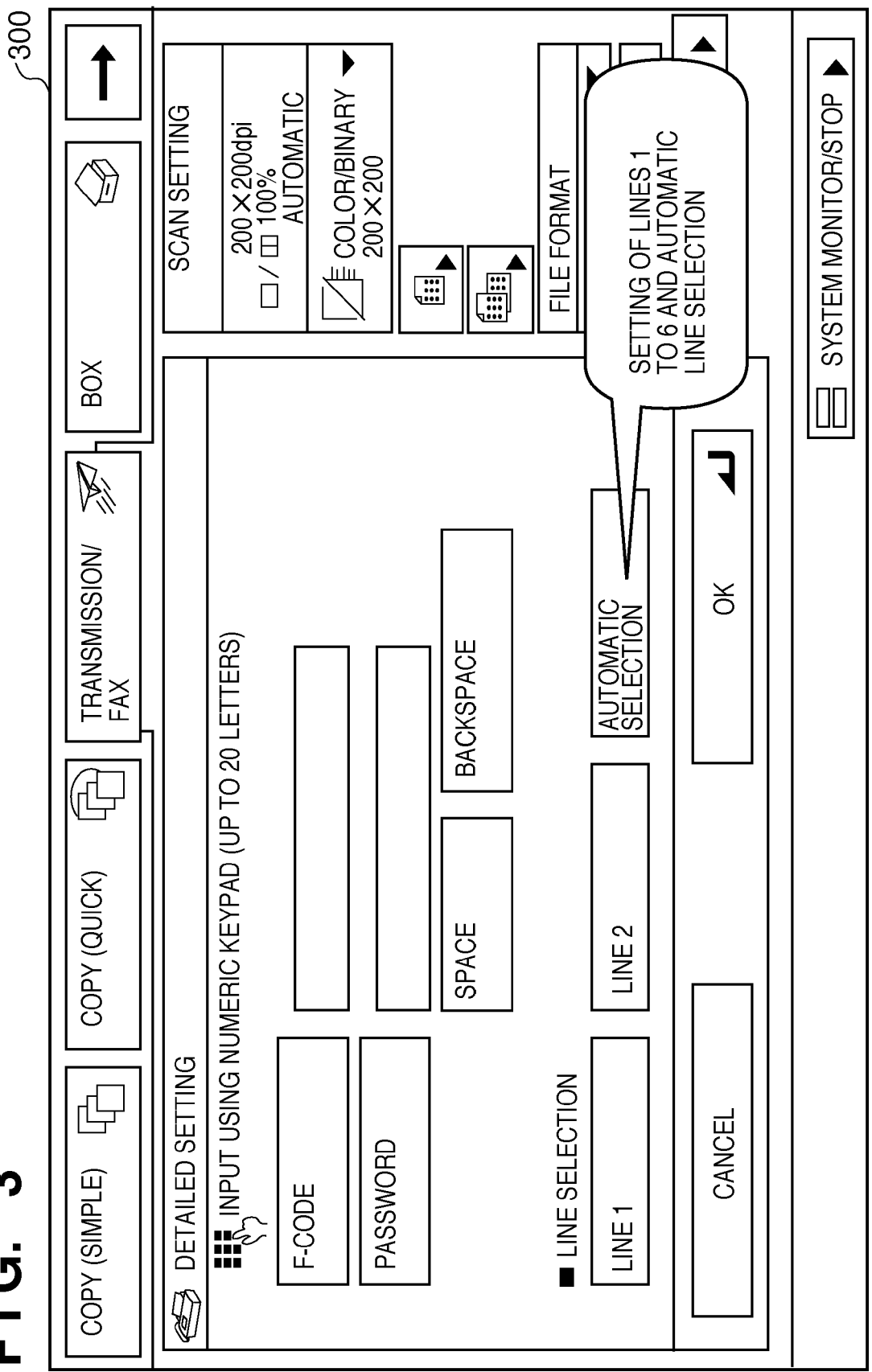
FIG. 3 is a view showing a setting screen 300 used at the time of FAX transmission.

A method of designating a line used to transmit data from the printer 100 to another apparatus will be described below with reference to FIG. 3. FIG. 3 is a view showing a setting screen 300 used at the time of FAX transmission. The setting screen 300 is displayed on the display unit 207. Note that a touch panel type liquid crystal display is used as the display unit 207, and buttons displayed on the setting screen 300 indicate selectable software keys. The setting screen 300 is used to designate a line used in data transmission. The user can designate a line used to transmit data by selecting one of software keys displayed in a line designation field on the lower side of the screen.

As shown in FIG. 3, the setting screen 300 displays three buttons "line 1", "line 2", and "automatic selection" as those used to designate a line. However, since the printer 100 has six lines, seven buttons "line 1", "line 2", "line 3", "line 4", "line 5", "line 6", and "automatic selection" are displayed in practice.

When the user presses a button corresponding to one of lines 1 to 6 other than the automatic selection button on the setting screen 300, the printer 100 transmits data using the line corresponding to the pressed button. On the other hand, when the user presses the automatic selection button on the setting screen 300, the printer 100 automatically selects a line used to transmit data according to a priority transmission setting (to be described later), and transmits data using the selected line.

Figure 4:
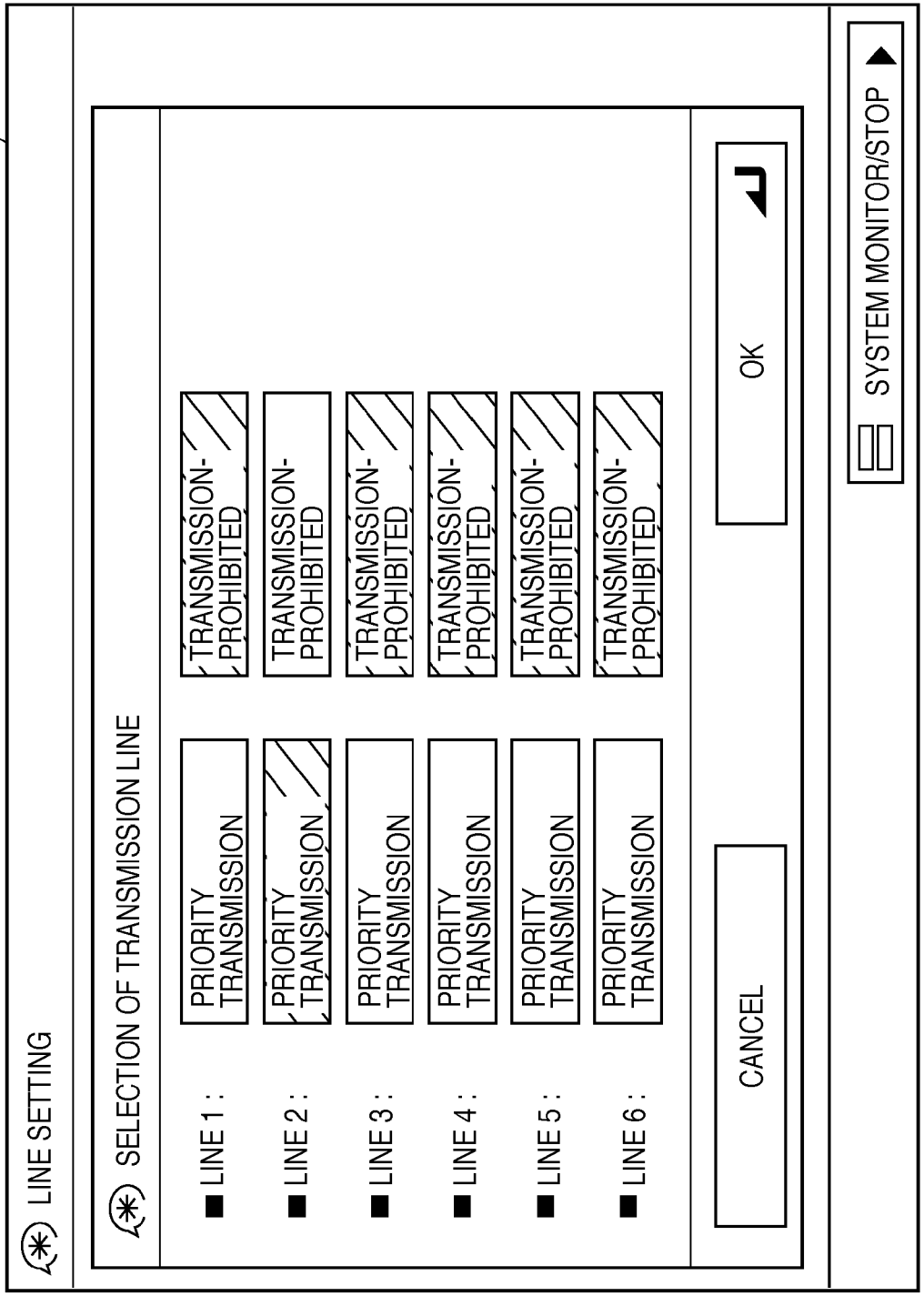
FIG. 4 is a view for explaining a setting example of priority transmission line designation according to the first embodiment.

FIG. 4 is a view for explaining the priority transmission setting according to the first embodiment. A setting screen 400 shown in FIG. 4 is used to designate a priority transmission line and transmission-prohibited lines.

The setting screen 400 shows an example in which line 2 is designated as a priority transmission line, and all of remaining lines 1 and 3 to 6 are set as transmission-prohibited lines. Upon transmitting data by designating automatic line selection in this setting state, line 2 is automatically selected as that used to transmit data, and data is transmitted using line 2.

Figure 5A:
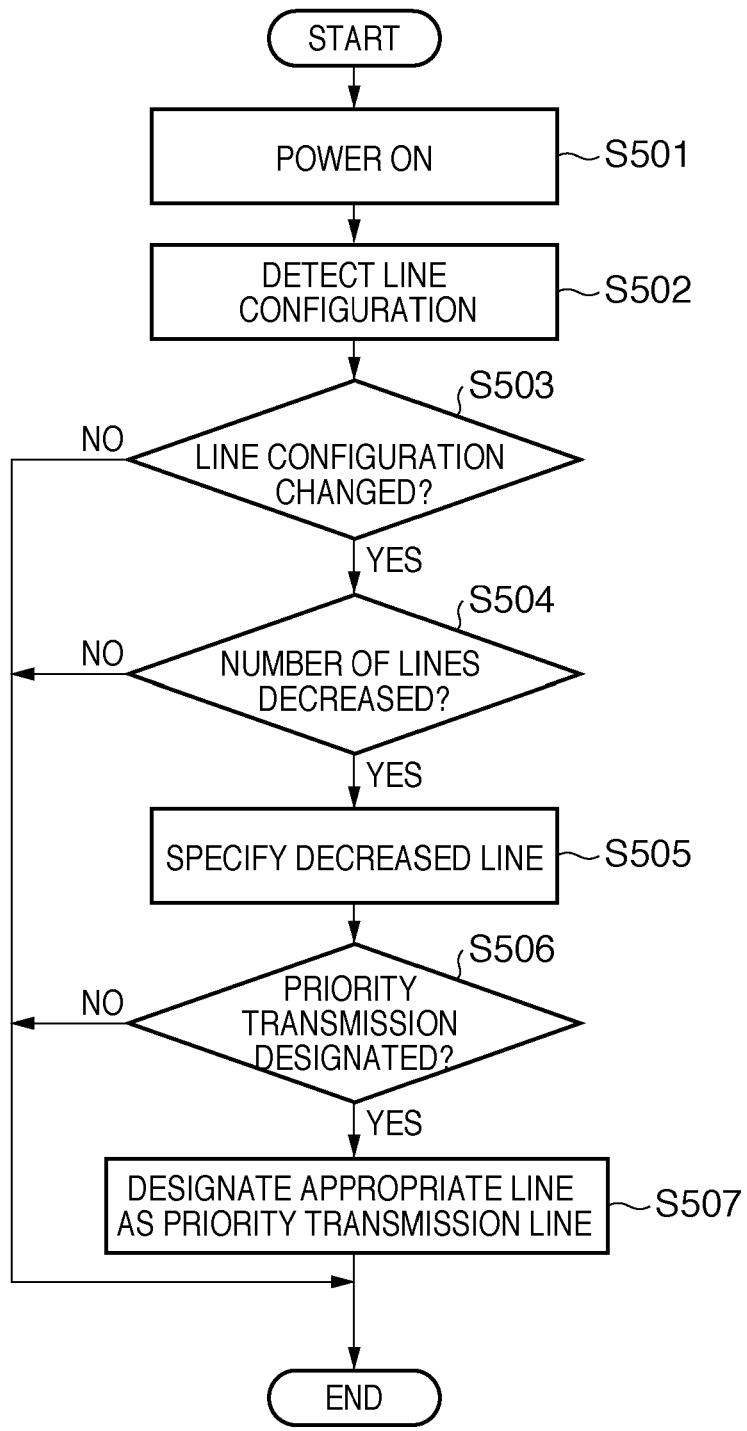
FIG. 5A is a flowchart showing the processing sequence executed when a line falls into a disabled state according to the first embodiment.
Figure 5B:
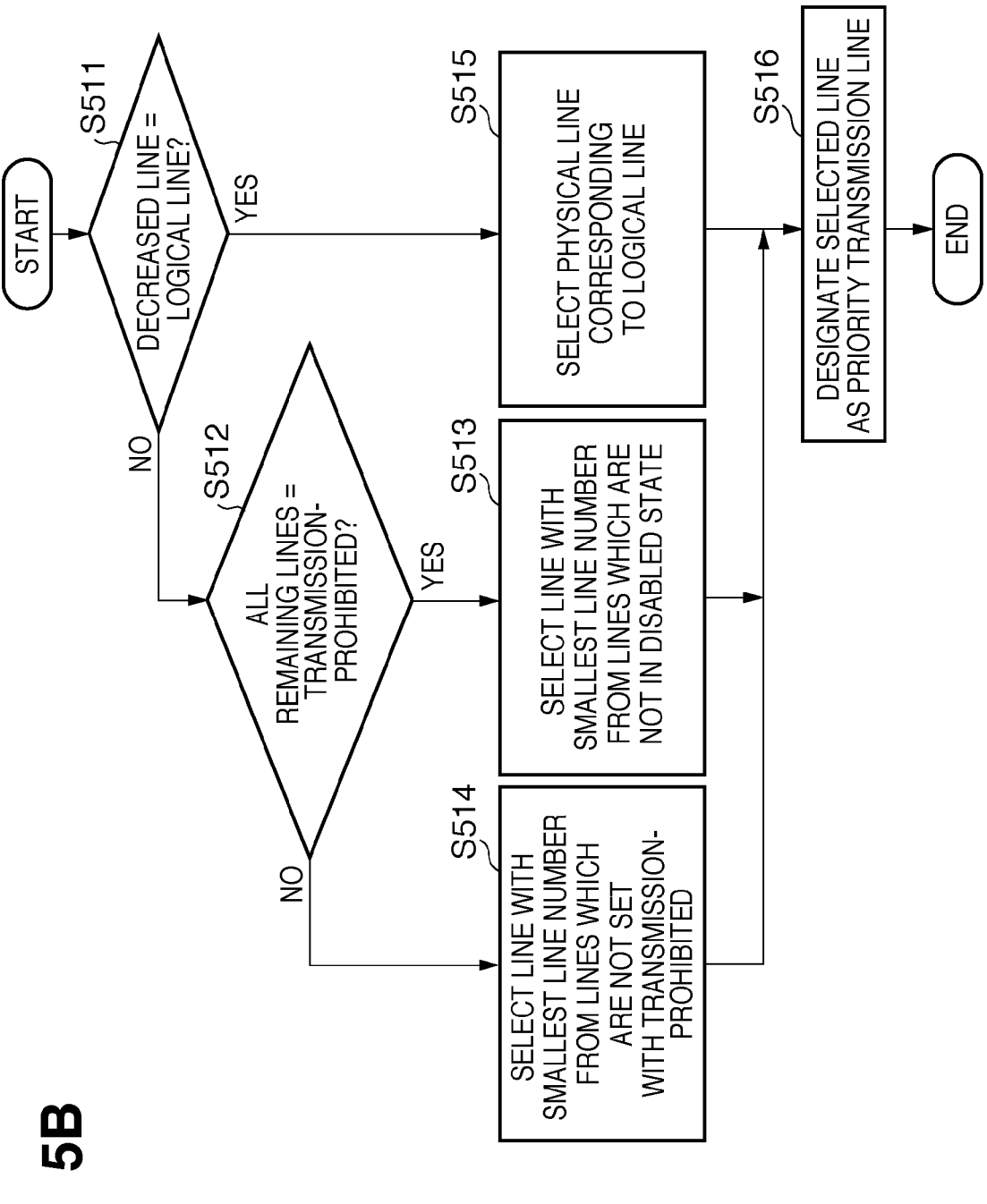
FIG. 5B is a flowchart showing the processing sequence executed when a line designated as a priority transmission line falls into a disabled state according to the first embodiment.

Control executed when a line falls into a disabled state will be described below with reference to FIGS. 5A and 5B. FIG. 5A is a flowchart showing the processing sequence executed when a line falls into a disabled state according to the first embodiment. The control to be described below is systematically controlled by the controller 203. Note that not only a physical line but also a logical line such as a dial-in number or the like are assumed as the types of lines which fall into a disabled state in this embodiment. However, a case will be explained first wherein a physical line falls into a disabled state.

<When a Physical Line Falls into Disabled State>

The flowchart shown in FIG. 5A shows the processes from the power-ON timing of the printer 100 after a line has fallen into a disabled state. Note that the settings for respective lines before a line falls into a disabled state are stored in the hard disk or memory shown in FIG. 2.

After power-ON of the printer 100 in step S501, the controller 203 executes initial activation processing. In step S502, the controller 203 serves as a detection unit to detect the current line configuration of the printer 100. More specifically, after power-ON, the controller 203 detects whether or not the FAX controller 210 exists. If it is detected that the FAX controller 203 is connected, the controller 203 detects the number of lines accommodated in the FAX controller 210.

In step S503, the controller 203 compares the number of lines detected in step S502 at the current power-ON timing, and that at the previous power-ON timing, which is indicated by information stored in advance in the hard disk or the like to check if the number of lines is changed. If the number of lines remains the same (NO in step S503), the controller 203 terminates the processing. On the other hand, if the number of lines is changed (YES in step S503), the controller 203 advances the process to step S504. Subsequently, the controller 203 determines in step S504 if the number of lines is decreased or increased. If the number of lines is increased (NO in step S504), the controller 203 terminates the processing. On the other hand, if the number of lines is decreased (YES in step S504), the controller 203 detects that at least one line has fallen into a disabled state, and advances the process to step S505.

If it is detected that at least one line has fallen into a disabled state, the controller 203 identifies in step S505 if the line in the disabled state is a physical or logical line. In this case, if a physical line has fallen into a disabled state, it is determined by, for example, detecting whether or not a physical device (e.g., a FAX modem) corresponding to that line exists.

Furthermore, even when the aforementioned device exists, the status of the line can be detected based on whether or not the line corresponding to the device is connected to the telephone network 110. In this case, whether or not the line is connected can be detected by detecting a voltage supplied from the telephone network 110. In this manner, not only the number of lines in the disabled state is determined, but also the types of lines in the disabled state are detected by detecting the statuses of the lines.

In step S506, the controller 203 serves as a determination unit to determine if the line in the disabled state is designated as that used for a specific application. That is, in this embodiment, the controller 203 determines if the line in the disabled state is that designated as a priority transmission line. Note that this determination is made based on information stored in the memory at the previous power-ON timing. More specifically, although the line set as priority transmission was included at the previous power-ON timing, if no line set as priority transmission is included at the current power-ON timing, the controller 203 can determine that the line in the disabled state was set as priority transmission. Note that whether or not the line in the disabled state was a priority transmission line may be determined using methods other than the aforementioned method.

If the line in the disabled state is a priority transmission line (YES in step S506), the controller 203 advances the process to step S507. On the other hand, if the line in the disabled state is not a priority transmission line (NO in step S506), the controller 203 terminates the processing.

In step S507, the controller 203 serves as a designation unit to select a line to be designated as a priority transmission line from the remaining lines other than the line in the disabled state, and to designate the selected line as a new priority transmission line. In this way, when the line designated as a priority transmission line falls into a disabled state, the printer 100 according to this embodiment automatically designates another line as a new priority transmission line.

<When a Logical Line Falls into Disabled State>

Control executed when a logical line falls into a disabled state will be described below with reference to FIG. 5A. Note that a description of the same control as that executed when the physical line falls into a disabled state will not be repeated. That is, only the processes in steps S502 to S504 will be explained below.

In steps S502 to S504, the controller 203 executes detection about a physical line by the aforementioned method, and also needs to detect whether or not a logical line added by the dial-in service has fallen into a disabled state.

The dial-in service requires settings on the printer 100 side, and one of "ON" (to use the dial-in service)/"OFF" (not to use that service) can be selected for each line on the printer 100 side. Therefore, when the administrator of the printer 100 signs up for the dial-in service, he or she needs to make settings to use the dial-in service of that line. Furthermore, when the administrator cancels the dial-in service contract, simultaneously with canceling, he or she must perform settings so as not to use the dial-in service for the corresponding line in the printer 100.

Whether or not a logical line has fallen into a disabled state can be determined by confirming whether this dial-in service setting is changed from "ON" to "OFF". More specifically, the controller 203 stores the dial-in service settings for respective lines, and compares the settings at the current power-ON timing with the stored settings at the previous power-ON timing. In this way, the controller 203 detects that a logical line has fallen into a disabled state due to cancellation of a dial-in service contract.

<Priority Transmission Line Designation Processing>

The automatic designation operation of a priority transmission line executed in step S507 in FIG. 5A will be described below. The processing to be described below is executed only when the line in the disabled state is designated as a priority transmission line. In this case, the settings of the remaining lines (i.e., lines in an enabled state) other than the line in the disabled state are confirmed, and a new priority transmission line is designated according to the confirmation result.

The operation executed when a physical line falls into a disabled state will be described first. A case will be explained below wherein all the lines other than the line in the disabled state are set as transmission-prohibited, as shown in the setting screen 400.

Figure 6:
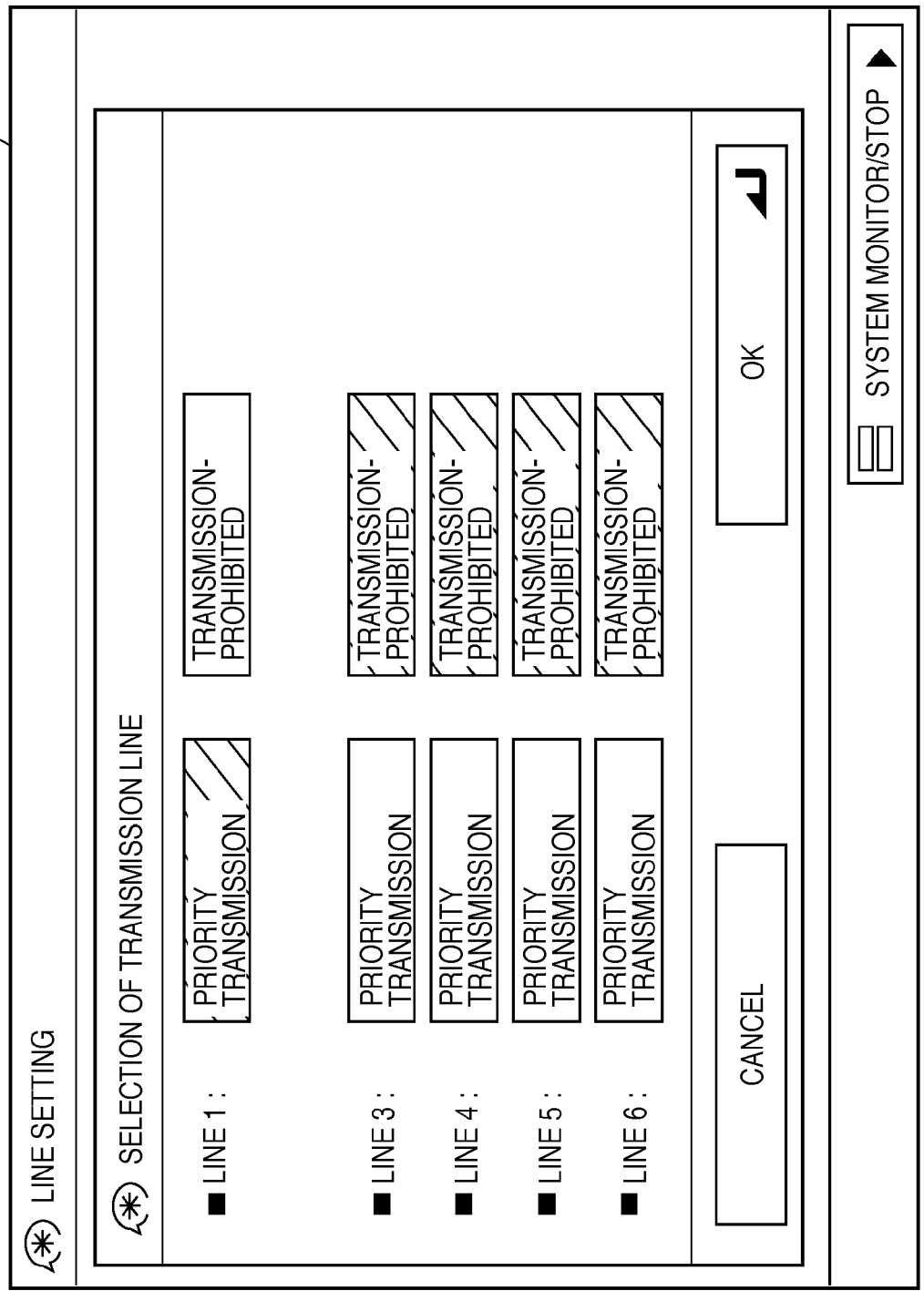
FIG. 6 is a view showing a setting screen 600 after the settings are changed.

In this case, the controller 203 serves as a cancel unit and designation unit to select a line with the smallest line number of the remaining lines other than the line in the disabled state, to cancel the transmission-prohibited setting of that line, and to designate that line as a new priority transmission line. This is because the line with the smallest line number is designated as a priority transmission line since its frequency of use is expected to be high. More specifically, when line 2 falls into a disabled state in the situation shown in FIG. 4, the controller 203 selects line 1 with the smallest line number from remaining lines 1, 3, 4, 5, and 6. FIG. 6 shows a state in which line 1 is designated as a new priority transmission line. FIG. 6 shows a setting screen 600 after line 1 is designated as a new priority transmission line. As shown in the setting screen 600, line 2 falls into a disabled state, and line 1 is designated as a new priority transmission line. Note that the example in which a line to be designated as a new priority transmission line is selected in ascending order of line number has been explained. However, a line to be designated as a new priority transmission line may be selected using other methods.

The controller 203 may designate a line that cannot externally connect a telephone or handset as a communication terminal (or that does not connect such device) as a new priority transmission line of the remaining lines other than the line in the disabled state. Since a line that can externally connect a telephone or the like is expected to be also used in speech communications, that line is excluded from candidates of a priority transmission line, and a line to be designated as a new priority transmission line is selected from lines other than that line. When there are a plurality of lines that cannot externally connect a telephone, a line with the smallest line number is selected from among these lines. The memory 204 serving as a storage unit stores information indicating lines which can connect a communication terminal for speech communications, and the controller 203 can identify based on this information whether or not a communication terminal can be connected for each line.

The communication apparatus having a plurality of lines like the printer 100 does not have an arrangement that allows connection of external telephones to all the lines, and the number of lines that can connect an external telephone is limited to one. In this case, line 1 normally has such arrangement. From the example in FIG. 4, when line 2 falls into a disabled state, since line 1 can connect an external telephone, a line with the smallest line number (e.g., line 3) of those other than line 1 is selected as a line to be designated as a new priority transmission line.

A case will be explained below wherein a physical line falls into a disabled state, and lines other than the line in the disabled state include those which are not set as transmission-prohibited, as shown in a setting screen 700 in FIG. 7.

In this case, the controller 203 serves as a designation unit to preferentially select a line which is not set as transmission-prohibited of those other than the line in the disabled state. For example, since lines 1 and 4 are not set as transmission-prohibited based on the settings on the setting screen 700, the controller 203 designates line 1 with the smaller line number as a new priority transmission line. In this way, when there are a plurality of lines which are not set as transmission-prohibited of those other than the line in the disabled state, the controller 203 selects a line with the smaller line number as a priority transmission line.

At this time, the controller 203 may select a line to which a telephone or handset is not externally connected of those other than the line in the disabled state as a line to be designated as a priority transmission line. For example, when an external telephone can be connected to line 1, the controller 203 designates line 4 which has the smaller line number next to line 1 as a new priority transmission line.

A case will be described below wherein a logical line falls into a disabled state. When a logical line falls into a disabled state as well, the operation for confirming the settings of lines other than the line in the disabled state is the same as that executed when a physical line falls into a disabled state. However, in case of a logical line, a corresponding physical line exists unlike a physical line.

An assignment example of line numbers using the dial-in service will be described below. In the following example, there are three physical lines, and one dial-in number is given to each of these physical lines:

Line 1: physical line
Line 2: logical line of line 1 (dial-in number line)
Line 3: physical line
Line 4: logical line of line 3 (dial-in number line)
Line 5: physical line
Line 6: logical line of line 5 (dial-in number line)

In the aforementioned configuration, when the dial-in service contract with the service provider for line 1 (physical line) is canceled, and the dial-in service setting of line 1 in the printer 100 is set to "OFF", line 2 falls into a disabled state.

It should be noted that a physical line (line 1) exists in correspondence with line 2 as that to be shared with it. In this case, since line 2 as the logical line falls into a disabled state, a physical line corresponding to that logical line is designated as a new priority transmission line. This is because the user of a logical line which is added to a physical line as a result of the dial-in service contract with the service provider is often the same as the user of the corresponding physical line. That is, when a certain logical line falls into a disabled state, the corresponding physical line as a line having a closer use environment (e.g., used by a common operator) is designated as a priority transmission line, thus maintaining a state closer to an environment before the disabled state.

More specifically, when line 2 falls into a disabled state in the setting contents of the setting screen 400 in FIG. 4, the controller 203 designates line 1 as the physical line corresponding to line 2 as a new priority transmission line. In this manner, when a physical line falls into a disabled state, a line to be designated as a new priority transmission line is selected while avoiding a line that can connect an external telephone. On the other hand, when a logical line falls into a disabled state, the maintenance of the sharing relationship is prioritized, and even when the corresponding physical line can connect an external telephone, that physical line is designated as a new priority transmission line. Also, when a logical line falls into a disabled state, and the corresponding physical line is set as transmission-prohibited, even if another line which is not set as transmission-prohibited is available, the transmission-prohibited of the corresponding physical line is canceled, and that physical line is designated as a new priority transmission line.

The priority transmission line designation operation will be described below with reference to FIG. 5B. FIG. 5B is a flowchart showing the processing sequence executed when a line set as priority transmission falls into a disabled state according to the first embodiment. Note that the control to be described below is systematically controlled by the controller 203.

The controller 203 determines in step S511 if a line which has fallen into a disabled state is a logical line. If the line in the disabled state is a logical line (YES in step S511), the controller 203 advances the process to step S515. In step S515, the controller 203 serves as a designation unit to select a physical line corresponding to the logical line in the disabled state as a line to be designated as a new priority transmission line, and then advances the process to step S516.

On the other hand, if it is determined in step S511 that the line in the disabled state is not a logical line (NO in step S511), the controller 203 determines in step S512 if all lines other than the line in the disabled state are set as transmission-prohibited. If all the lines are set as transmission-prohibited (YES in step S512), the controller 203 serves as a designation unit to select a line with the smallest line number of those other than the line in the disabled state as a line to be designated as a new priority transmission line in step S513. In this step, the controller 203 may select a line with the smallest line number of those which cannot connect an external telephone, as described above.

If it is determined in step S512 that at least one of lines other than the line in the disabled state is not set as transmission-prohibited (NO in step S512), the process advances to step S514. In step S514, the controller 203 serves as a designation unit to select a line with the smallest line number of those which are not set as transmission-prohibited as a line to be designated as a new priority transmission line. In this step, the controller 203 may select a line with the smallest line number of those which cannot connect an external telephone and are not set as transmission-prohibited, as described above.

Finally, in step S516 the controller 203 designates the line selected in one of steps S513 to S515 as a new priority transmission line.

As described above, when a line falls into a disabled state and that line is designated as that used for the specific application, the printer 100 according to this embodiment selects another line, and designates the selected line as a new line used for the specific application. As a result, when a line designated as that used for the specific application falls into a disabled state, the printer 100 can prevent a situation that no line used for that purpose is available. When a line designated as that used for the specific application falls into a disabled state in this way, another line is automatically designated as a new line used for that specific application, without requiring any troublesome operations on the part of the user, resulting in enhanced convenience.

Note that the present invention is not limited to the aforementioned embodiment, and various modifications may be made. For example, the printer 100 may determine if a line that has fallen into a disabled state is a physical line or a logical line of a dial-in number added to that physical line. In this case, the printer 100 can select a line to be designated as that used for the specific application in accordance with this determination result. As a result, when the line in the disabled state is a logical line, the printer 100 can use the corresponding physical line as a new line used for the specific application. This is to maintain the sharing relationship between the physical and logical lines, and allow selection of a more optimal line.

When the line in the disabled state is designated as a priority transmission line, the printer 100 may automatically select an optimal line as that to be designated as a priority transmission line from other lines, and may designate the selected line as a new priority transmission line.

The printer 100 may determine for each line if a communication terminal such as a telephone, handset, or the like can be externally connected. In this case, the communication apparatus can exclude a line that can connect such a communication terminal from candidates of a line to be designated as a new line used for the specific application. In this manner, the printer 100 can suppress an adverse effect in terms of use as a result of preferential selection of a line that can externally connect the communication terminal when transmitting data.

A second embodiment will be described below with reference to FIGS. 8 to 13. This embodiment will explain control executed when settings exist to transfer data received using a specific line to another apparatus, and that line falls into a disabled state.

Figure 11:
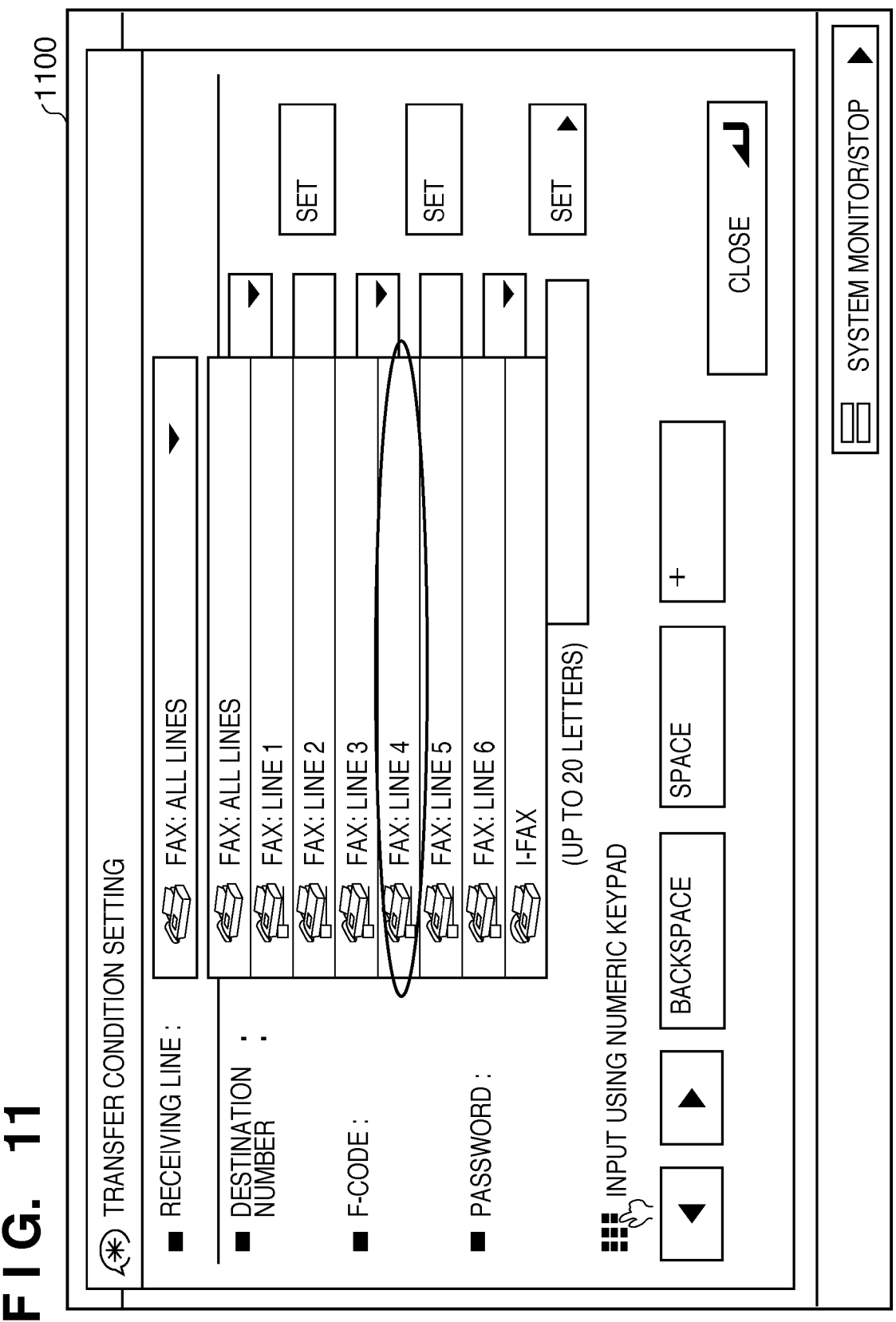
FIG. 11 is a view showing a setting screen 1100 used to set the transfer condition.

A case assumed in this embodiment will be described first with reference to FIG. 11. FIG. 11 is a view showing a setting screen 1100 used to set a transfer condition. "Transfer" in this case indicates that upon reception of data, if that data matches a transfer setting registered in advance by the user, the received data is transferred to a predetermined transfer destination. For example, the transfer setting includes a receiving line, transfer destination number, F-code, password, and the like, as shown in the setting screen 1100.

The transfer setting is to transfer data received using a designated line to another apparatus. For example, all lines, or one of lines 1 to n can be selected as the receiving line. Note that n indicates the number of lines, and n=6 in this embodiment. Selection of "all lines" means that transfer is made irrespective of the receiving line. Selection of one of lines 1 to n means that upon reception of data using the selected line, the received data is transferred to a transfer destination.

The F-code is identification information exchanged as FAX procedure signals. When a communication apparatus on the transmitting side designates an F-code, it can control a communication apparatus on the receiving side to execute processing (e.g., transfer) corresponding to the designated F-code. The transfer destination number is used to transfer data to a communication apparatus corresponding to the transfer destination number via the transfer-setting line by setting the number of a transfer destination in advance. On the setting screen 1100, a password for using the corresponding line can also be set. Furthermore, a function of validating or invalidating the registered transfer condition is provided.

According to this embodiment, a case is handled in which the aforementioned transfer-setting line falls into a disabled state due to movement of the location of a printer, canceling of a dial-in service contract, or the like. On the setting screen 1100, line 4 is set as the receiving line. In this case, if line 4 falls into a disabled state, the subsequent transfer is no longer be made. Conventionally, when the transfer-setting line falls into a disabled state, a user such as the administrator or the like needs to re-set a line by performing troublesome operations. However, the communication apparatus according to this embodiment can automatically set the line without requiring such troublesome user operations.

Since the arrangement of the communication apparatus according to this embodiment is the same as that in the first embodiment, a repetitive description thereof will be omitted. In this embodiment, a description will be given under the assumption of the following line configuration.

The printer 100 as the communication apparatus according to this embodiment comprises three physical lines. Also, logical lines are added to all these physical lines by the dial-in service contract. Note that the types of respective lines are as follows:

Line 1: physical line
Line 2: physical line
Line 3: physical line
Line 4: logical line of line 1 (dial-in number line)
Line 5: logical line of line 2 (dial-in number line)
Line 6: logical line of line 3 (dial-in number line)

The transfer condition setting by the user and control executed when a line falls into a disabled state under the precondition of the aforementioned line configuration will be described below with reference to FIGS. 8 to 13.

Figure 8:
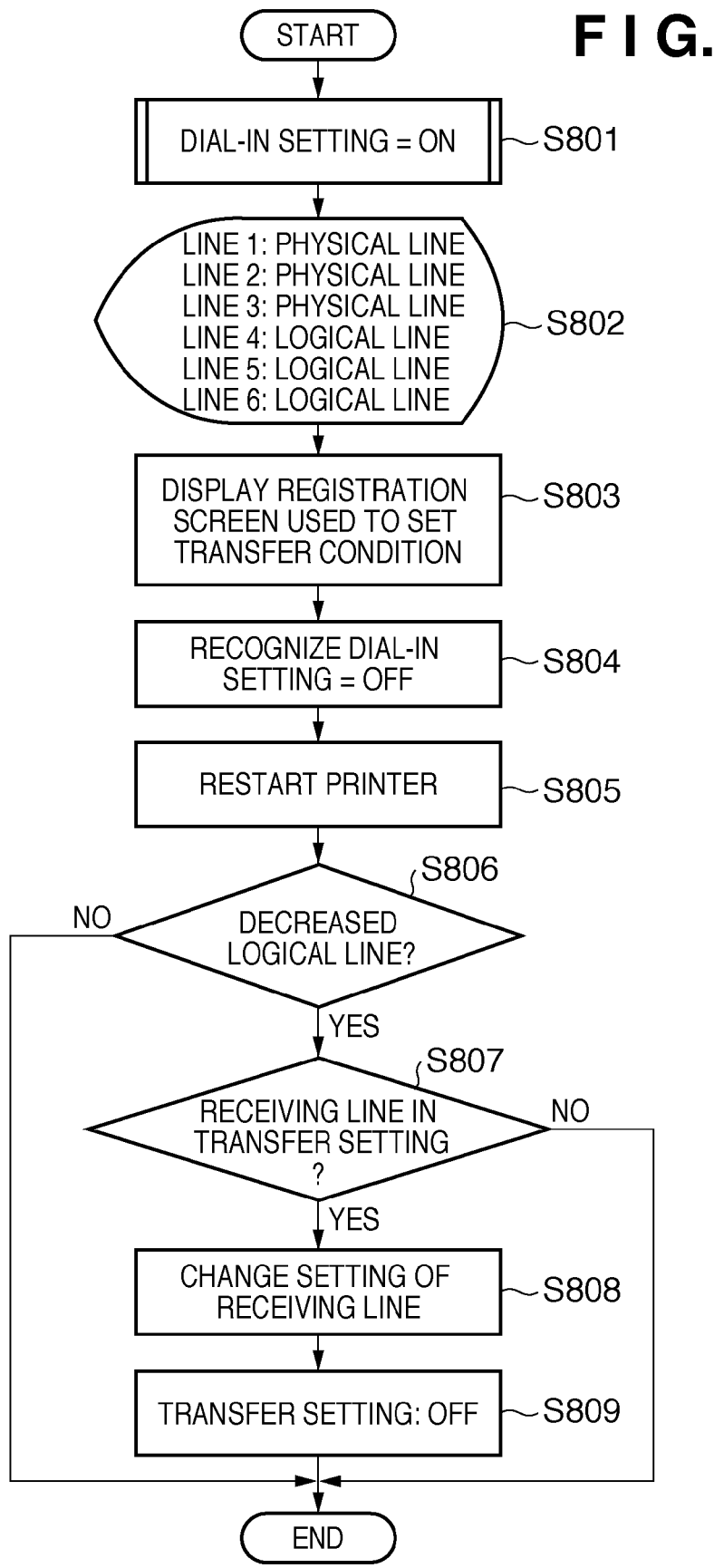
FIG. 8 is a flowchart showing the processing sequence executed when the number of lines is decreased according to the second embodiment.
Figure 9:
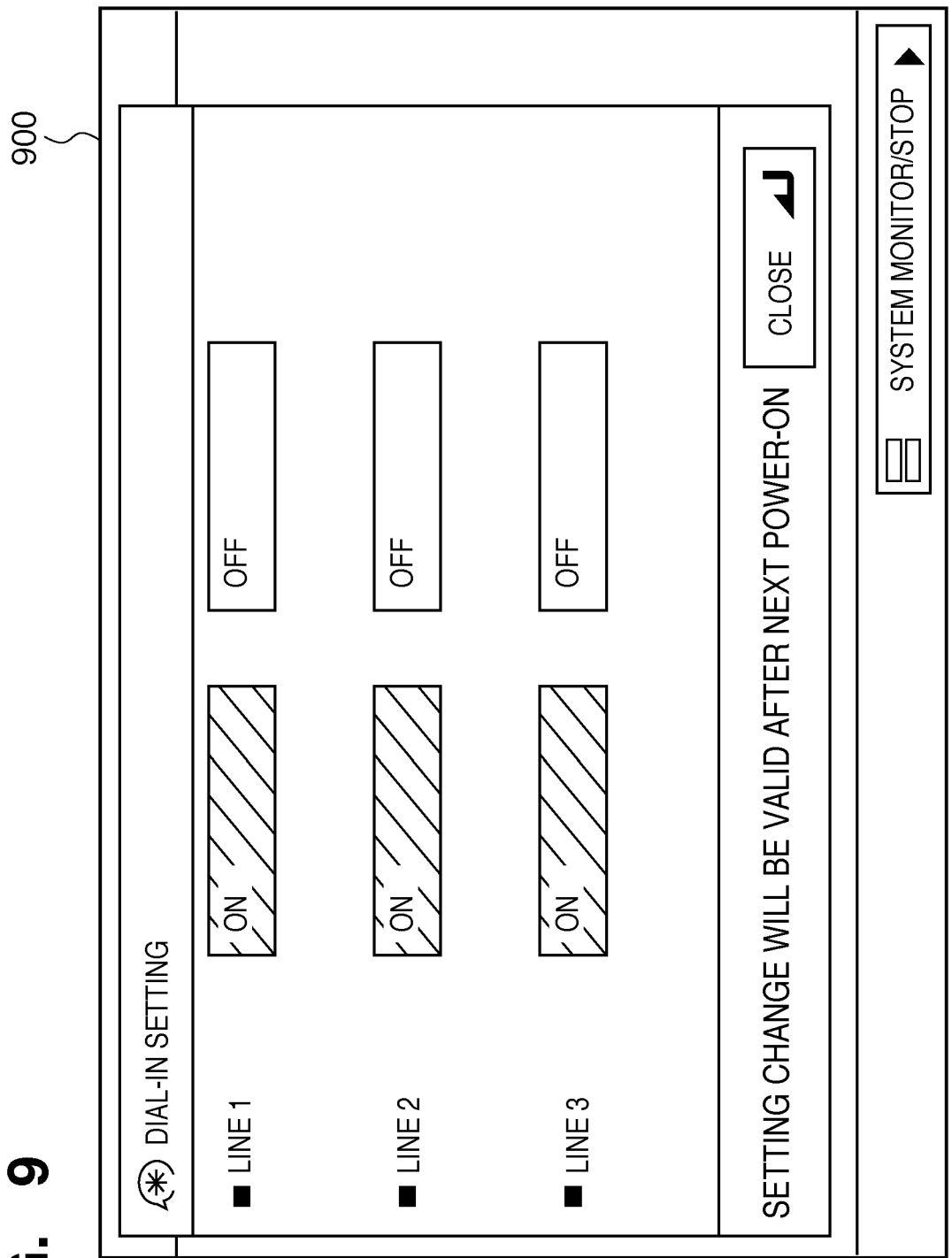
FIG. 9 is a view showing a setting screen 900 used to make dial-in service settings of physical lines.
Figure 10:
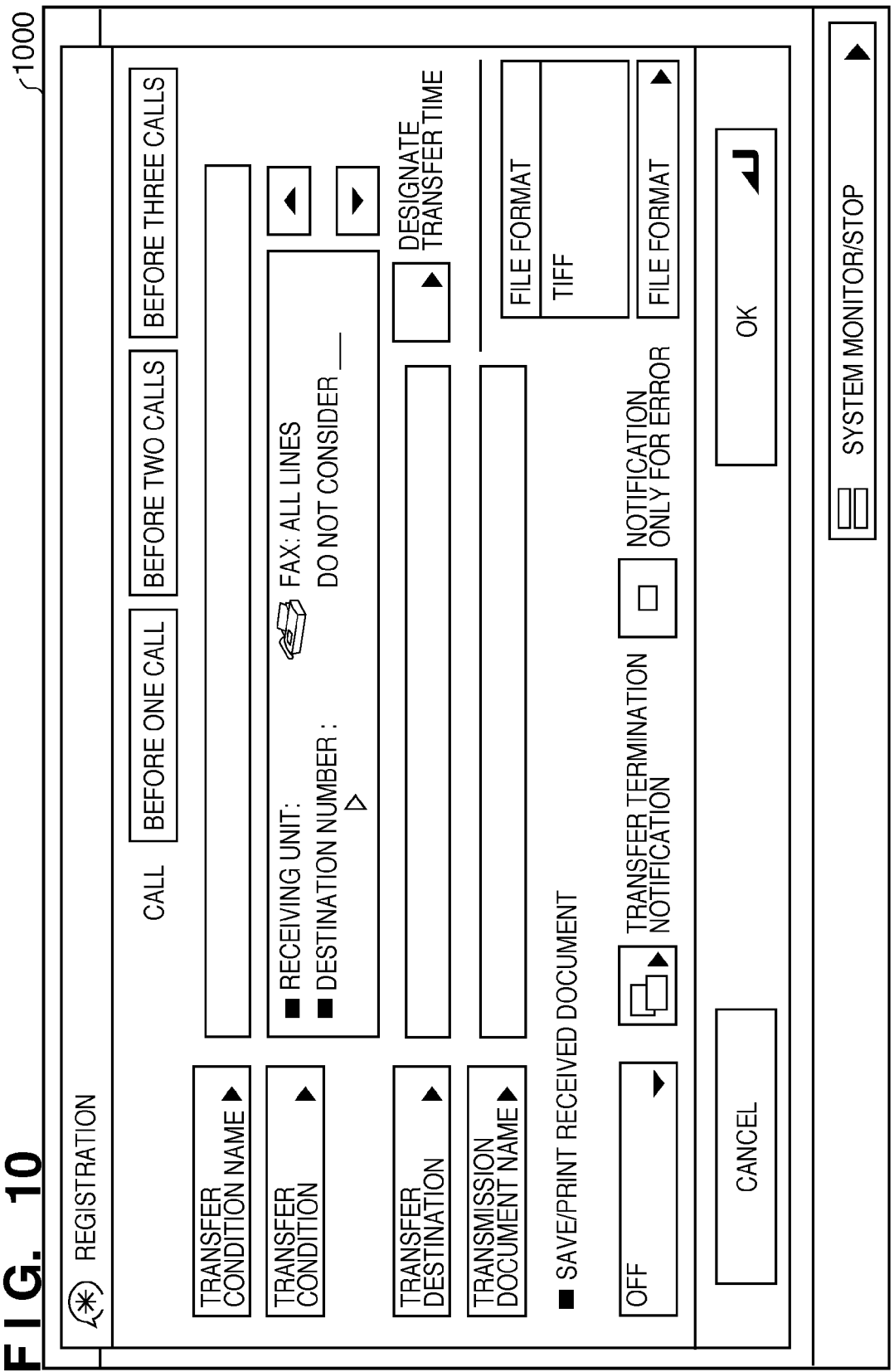
FIG. 10 is a view showing a registration screen 1000 used to register a transfer condition.
Figure 12:
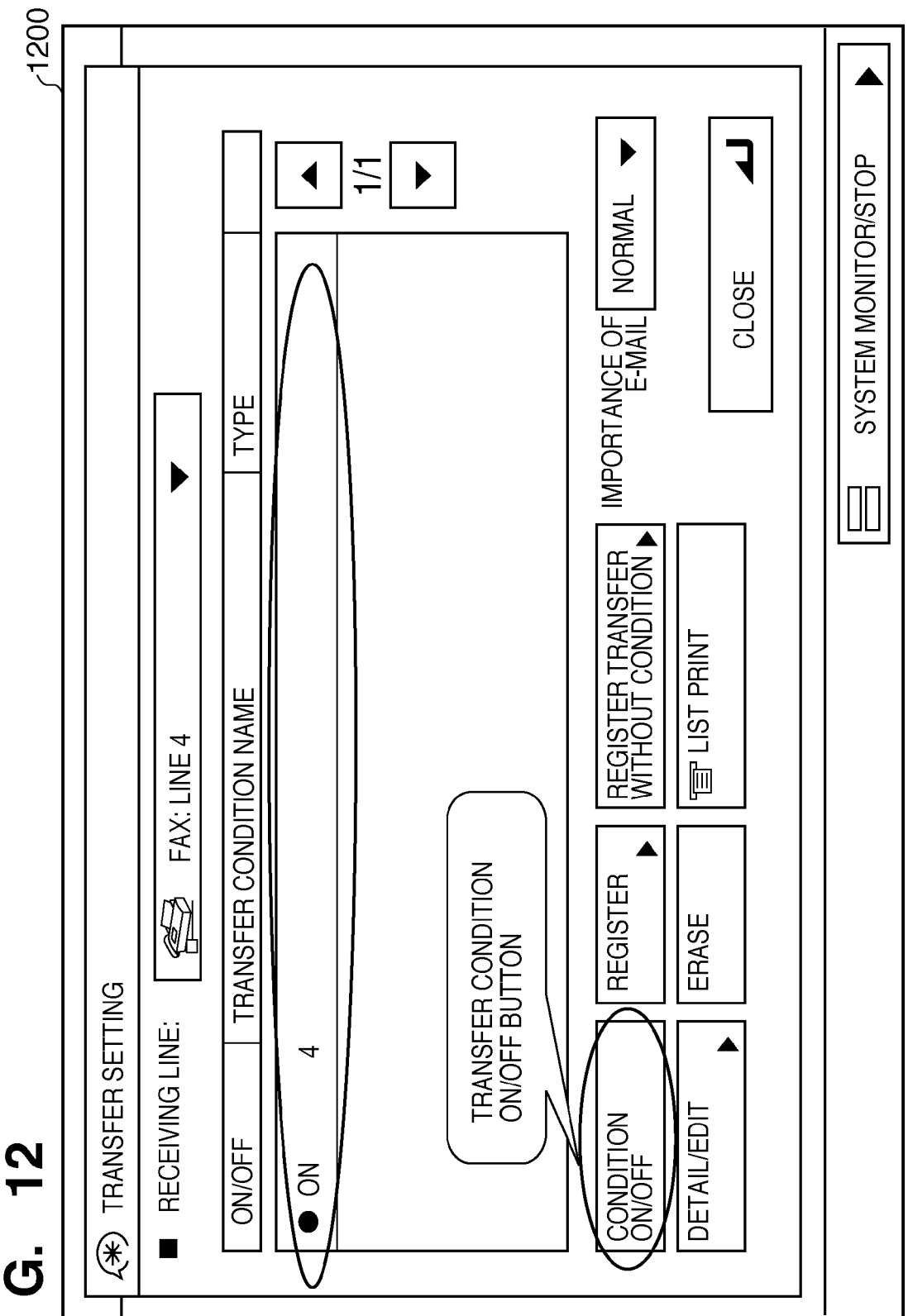
FIG. 12 is a view showing a setting screen 1200 used to validate or invalidate the set transfer condition.
Figure 13:
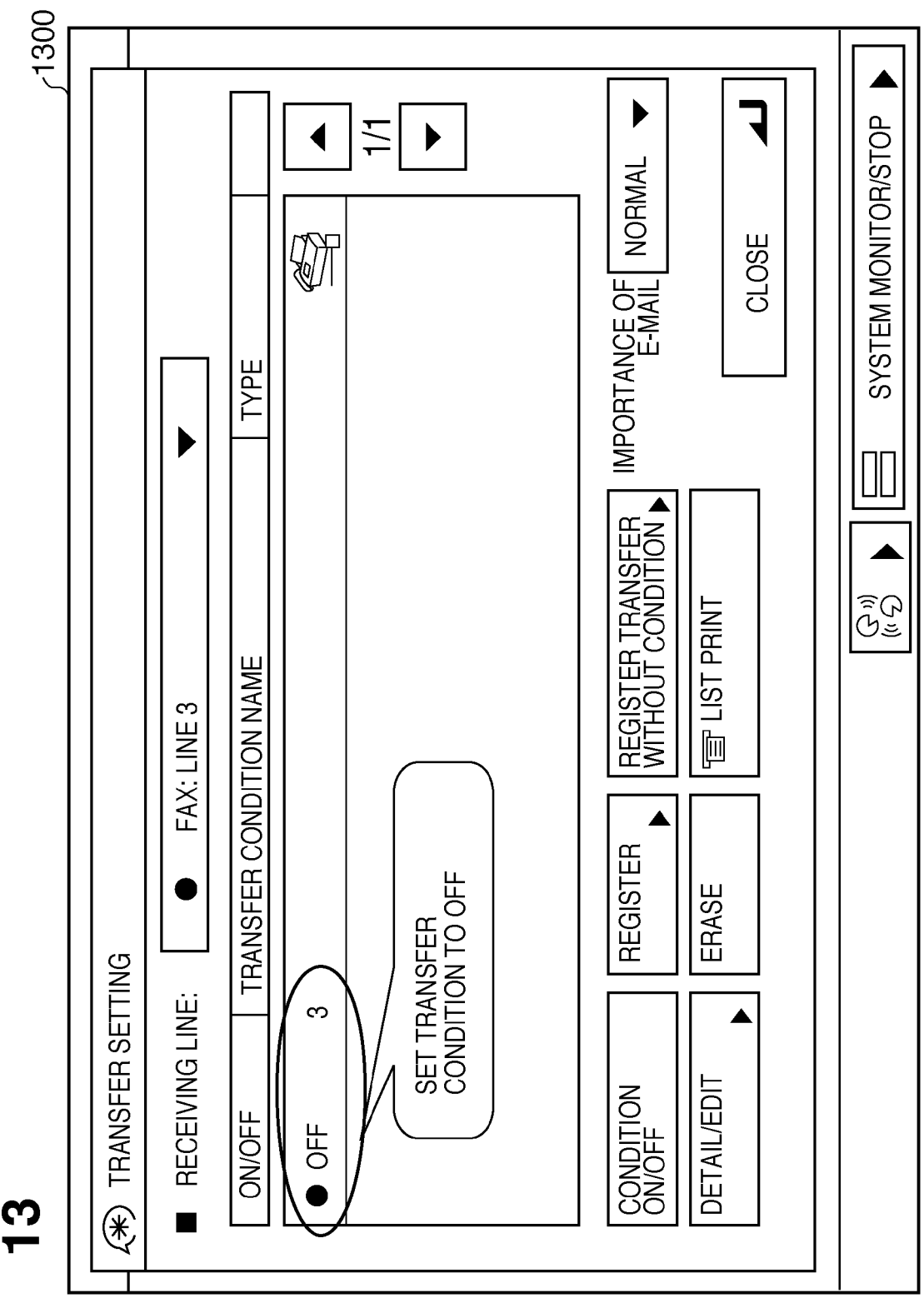
FIG. 13 is a view showing a setting screen 1300 after the set transfer condition is invalidated.

FIG. 8 is a flowchart showing the processing sequence executed when a line falls into a disabled state according to the second embodiment. FIG. 9 is a view showing a setting screen 900 used to set a dial-in service of a physical line. FIG. 10 is a view showing a registration screen 1000 used to register a transfer condition. FIG. 11 is a view showing the setting screen 1100 used to set the transfer condition. FIG. 12 is a view showing a setting screen 1200 used to validate or invalidate the set transfer condition. FIG. 13 is a view showing a setting screen 1300 after the set transfer condition is invalidated. A description will be given below along the flowchart shown in FIG. 8. Note that the processing to be described below is systematically controlled by the controller 203.

In steps S801 and S802, the controller 203 validates the dial-in service settings of lines 1 to 3 as the physical lines in accordance with the dial-in service settings made by the user. More specifically, the user makes the dial-in service settings via the setting screen 900 displayed on the display unit 207. As shown in the setting screen 900, by setting lines 1 to 3 to "ON", lines 4 to 6 are ready to use as dial-in service contract lines (logical lines).

In step S803, the controller 203 displays the registration screen 1000 used to register a transfer condition on the display unit 207. The user registers the transfer condition via the registration screen 1000, and the controller 203 acquires the registered contents and registers information indicating the transfer condition in the memory.

Details of registration of the transfer condition will be described below. When the user presses a "transfer condition" button displayed on the registration screen 1000, the controller 203 displays the setting screen 1100 used to set the transfer condition on the display unit 207. On the setting screen 1100, a receiving line is selected. Assume that line 4 as a logical line is selected in this case. Upon pressing a "close" button after the receiving line is selected, the controller 203 displays the registration screen 1000 that reflects the selected receiving line on the display unit 207. In this way, the transfer condition, transfer destination, and the like are registered on the registration screen 1000.

The controller 203 serves as a setting unit to display the setting screen 1200 used to validate or invalidate the registered transfer condition on the display unit 207. The user can validate or invalidate the registered transfer condition by selecting "ON" or "OFF". In this case, by setting the registered transfer condition of line 4 to "ON", as shown in the setting screen 1200, the transfer condition of line 4 is validated. After that, when data is received using line 4, if that data matches the set transfer condition, the received data is transferred to the transfer destination.

The processes (those in steps S801 to S803) described so far are those for setting the transfer condition so as to transfer received data. Control executed when line 4 with the aforementioned transfer setting falls into a disabled state will be described below along the processes in steps S804 to S809.

In step S804, the controller 203 recognizes that the user has selected "OFF" in the dial-in service settings. That is, the controller 203 detects that the dial-in service contract has been canceled, and a corresponding logical line falls into a disabled state. In this case, the controller 203 invalidates the dial-in service setting in which "OFF" is selected. As a result, the corresponding logical line ceases to be used. Note that the dial-in service settings are made on the aforementioned setting screen 900.

In step S805, the controller 203 restarts the printer 100 so as to reflect the changed settings. After restart, in step S806 the controller 203 serves as a detection unit to detect if a line which has fallen into a disabled state exists, and to determine, when such a line is detected, if the line in the disabled state is a logical line. If the line in the disabled state is not a logical line, that is, if the line in the disabled state is a physical line (NO in step S806), the controller 203 terminates the processing.

On the other hand, if the line in the disabled state is a logical line (YES in step S806), the controller 203 serves as a determination unit to determine in step S807 if the transfer setting is made for that line. More specifically, the controller 203 confirms the setting contents stored in the memory to determine whether or not the transfer setting has been made for that line. If the transfer setting has not been made for that line (NO in step S807), the controller 203 terminates the processing.

On the other hand, if the transfer setting has been made for that line (YES in step S807), the controller 203 serves as a designation unit to make the transfer setting for the physical line correspond to the logical line in step S808. In this embodiment, since line 4 as a logical line has fallen into a disabled state, the transfer setting is made for line 1 as a physical line to correspond to line 4. That is, when line 4 falls into a disabled state in a state in which it is set to transfer data received using line 4, it is newly set to transfer data received using line 1. Furthermore, the controller 203 serves as a setting unit to invalidate, in step S809, the transfer condition changed in step S808, as shown in the setting screen 1300.

In this way, after canceling of the dial-in service contract, the printer 100 according to this embodiment changes the receiving line in the transfer setting from line 4 to line 1, and then sets the changed transfer setting to "OFF". That is, by invalidating the changed transfer setting, the user himself or herself confirms the automatically changed contents, and sets that setting to "ON" if he or she is satisfied with that setting, thus validating the changed setting. Therefore, when the transfer-setting line falls into a disabled state, the user need not perform any troublesome transfer setting from the beginning, and an inadvertent transfer setting can be prevented from being validated by mistake.

As described above, even when a line set as the receiving line in the transfer setting falls into a disabled state, if that line is a logical line, the printer 100 according to this embodiment selects a physical line corresponding to that line as a receiving line, and re-sets it. That is, when a line designated as that to be used in transfer processing falls into a disabled state, a line other than that line is designated as a new line to be used in the transfer processing. In this way, when a line designated as the receiving line in the transfer setting falls into a disabled state, the communication apparatus automatically changes the setting, thus reducing the load on the user. Since the user need not manually change the setting, he or she can be prevented from making a wrong setting upon changing the setting.

Since the changed transfer setting is invalidated before the user confirms that setting, the transfer processing based on a wrong setting can be prevented. Also, the method of invalidating the changed setting may also be applied to the first embodiment.

In the examples described in the aforementioned first and second embodiments, when a line that falls into a disabled state is designated as a line used for the specific application, another line is automatically designated as a line used for the specific application. However, other modes may be adopted. That is, when a line that falls into a disabled state is designated as a line used for the specific application, the user may be notified that the line designated as that used for the specific application has fallen into a disabled state by displaying a guide message or the like. In this case, after the guide message is displayed, another line is designated as a new line used for the specific application based on a user's instruction.

The embodiments have been explained in detail, and the present invention can be put into practice in the forms of a system, apparatus, method, program, storage medium (recording medium), and the like. More specifically, the present invention can be applied to either a system constituted by a plurality of devices, or an apparatus consisting of a single device.

Note that the present invention includes the following case. That is, a program of software that implements the functions of the aforementioned embodiments (programs corresponding to the illustrated flowcharts in the embodiments) is directly or remotely supplied to a system or apparatus. A computer of that system or apparatus reads out and executes the supplied program codes, thereby achieving the present invention.

Therefore, the program codes themselves installed in a computer to implement the functional processing of the present invention using the computer implement the present invention. That is, the present invention includes the computer program itself for implementing the functional processing of the present invention.

In this case, the form of program is not particularly limited, and an object code, a program to be executed by an interpreter, script data to be supplied to an OS, and the like may be used as long as they have the program function.

As a recording medium for supplying the program, for example, the following media may be used: a floppy™ disk, hard disk, optical disk, magneto-optical disk, MO, CD-ROM, CD-R, CD-RW, magnetic tape, nonvolatile memory card, ROM, and DVD (DVD-ROM, DVD-R).

As another program supply method, the program can also be supplied by downloading it from a web page on the Internet using a browser on a client computer to a recording medium such as a hard disk or the like. That is, connection is established to the web page, and the computer program itself of the present invention or a compressed file including an automatic installation function is downloaded from the web page. Also, program codes that form the program of the present invention may be divided into a plurality of files, which may be downloaded from different web pages. That is, the present invention includes a WWW server which allows a plurality of users to download program files required to make a computer implement the functional processing of the present invention.

Also, a computer-readable storage medium such as a CD-ROM or the like, which stores the encrypted program of the present invention, may be delivered to the user. The user who has cleared a predetermined condition is allowed to download key information that decrypts the encrypted program from a web page via the Internet. The user then executes the encrypted program using that key information to install that program on a computer, thus implementing the present invention.

The functions of the aforementioned embodiments are implemented when the computer executes the readout program. In addition, an OS or the like, which runs on the computer, executes some or all of actual processes based on an instruction of that program, thereby implementing the functions of the aforementioned embodiments.

Furthermore, the functions of the aforementioned embodiments are implemented after the program read out from the recording medium is written in a memory equipped on a function expansion board or function expansion unit which is inserted in or connected to a computer. That is, a CPU or the like equipped on that function expansion board or unit executes some or all of actual processes based on an instruction of that program, thereby implementing the functions of the aforementioned embodiments.

According to the present invention, when a line, which is designated as that used for a specific application, falls into a disabled state, another line can be designated as a new line used for that specific application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-079215 filed on Mar. 25, 2008, which is hereby incorporated by reference herein in its entirety.

What is claimed is:

1. A communication apparatus having a plurality of lines, comprising:
a setting unit configured to set, for a line based on a user instruction, whether to permit transmission of data using the line;
a selecting unit configured to select, automatically, a line from among lines which are set to permit transmission of data;
a transmission unit configured to transmit data by the line selected by the selecting unit; and
a changing unit configured to automatically change, for a line, a setting not to permit transmission of data using the line to a setting to permit transmission of data using the line,
wherein when a predetermined line enters a disabled state and settings not to permit transmission of data are set for all lines other than the predetermined line, the changing unit automatically changes, for one line of the lines other than the predetermined line, the setting not to permit transmission of data using the one line to the setting to permit transmission of data using the one line.

2. The apparatus according to claim 1, wherein the predetermined line is a prior line to be selected by the selecting unit prior to other lines.

3. The apparatus according to claim 1, further comprising a prior line setting unit configured to set a line of the plurality of lines as a prior line.

4. The apparatus according to claim 1, wherein when the predetermined line enters the disabled state and settings not to permit transmission of data are set for all lines other than the predetermined line, the changing unit automatically changes, for one line which is not connected to a telephone used by a user of the communication apparatus, the setting not to permit transmission of data using the one line not connected to a telephone used by a user to the setting to permit transmission of data using the one line not connected to a telephone used by a user.

5. A method of controlling a communication apparatus having a plurality of lines, comprising:
setting, for a line based on a user instruction, whether to permit transmission of data using the line;
selecting, automatically, a line from among lines which are set to permit transmission of data;
transmitting data by the selected line; and
changing, automatically for a line, a setting not to permit transmission of data using the line to a setting to permit transmission of data using the line,
wherein, when a predetermined line enters a disabled state and settings not to permit transmission of data are set for all lines other than the predetermined line, for one line of the lines other than the predetermined line, the setting not to permit transmission of data using the one line is automatically changed to the setting to permit transmission of data using the one line.

6. A non-transitory computer-program product for use with a computer, the computer-program product comprising a computer-usable medium containing computer-executable instructions that controls a communication apparatus having a plurality of lines, the medium comprising:
computer-executable instructions that set, for a line based on a user instruction, whether to permit transmission of data using the line;
computer-executable instructions that select, automatically, a line from among lines which are set to permit transmission of data;
computer-executable instructions that transmits data by the selected line; and
computer-executable instructions that automatically change, for a line, a setting not to permit transmission of data using the line to a setting to permit transmission of data using the line,
wherein, when a predetermined line enters a disabled state and settings not to permit transmission of data are set for all lines other than the predetermined line, for one line of the lines other than the predetermined line, the setting not to permit transmission of data using the one line is automatically changed to the setting to permit transmission of data using the one line.

7. The apparatus according to claim 1, wherein the plurality of lines are telephone lines.

* * * * *